Nov. 15, 1949 J. GREGG 2,487,866
HIGH-FREQUENCY HEATED MOLD FOR SHOE SOLES
Filed Aug. 11, 1945 4 Sheets-Sheet 1
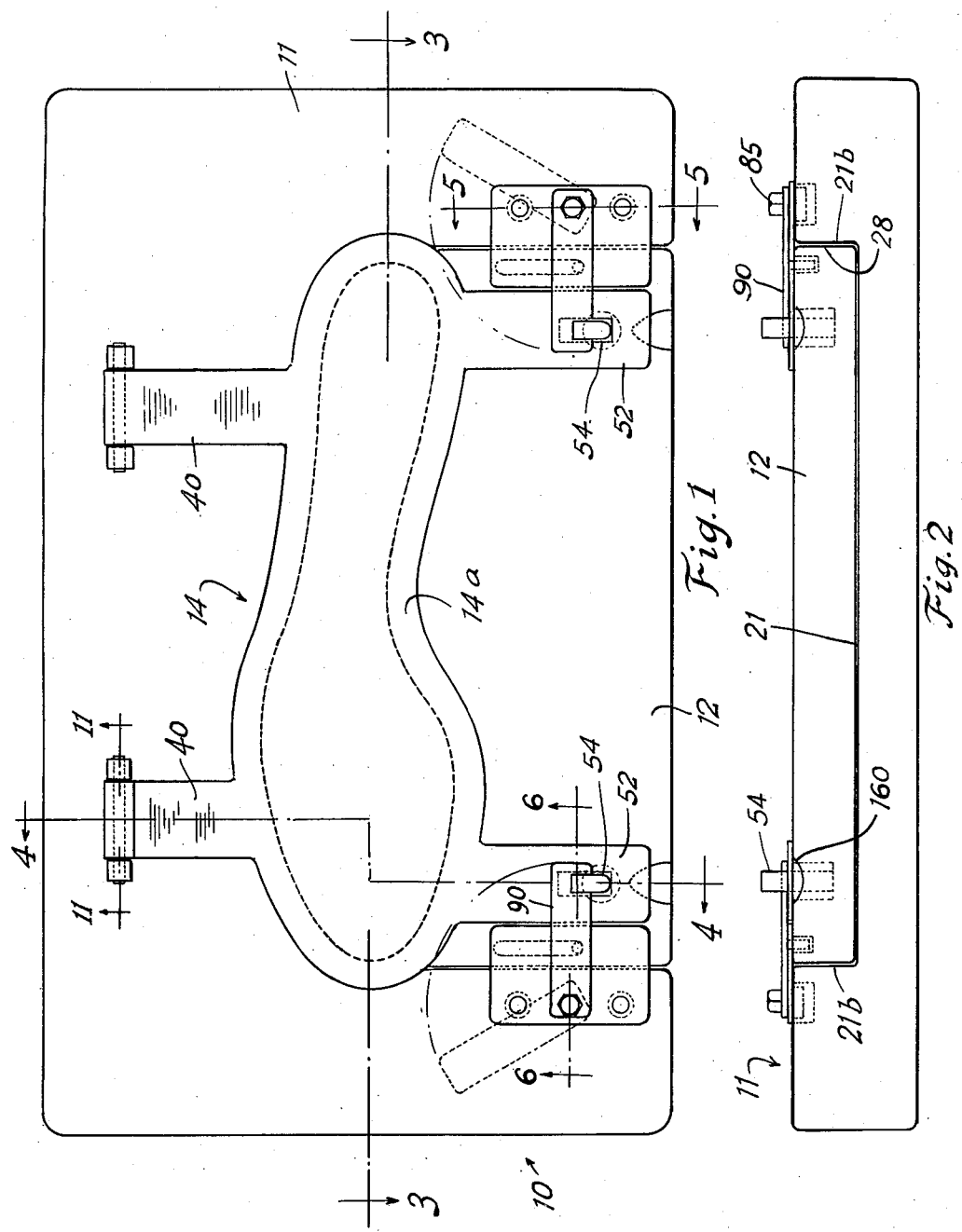
INVENTOR.
Jon Gregg
BY
J. B. Felzkin
ATTORNEY.

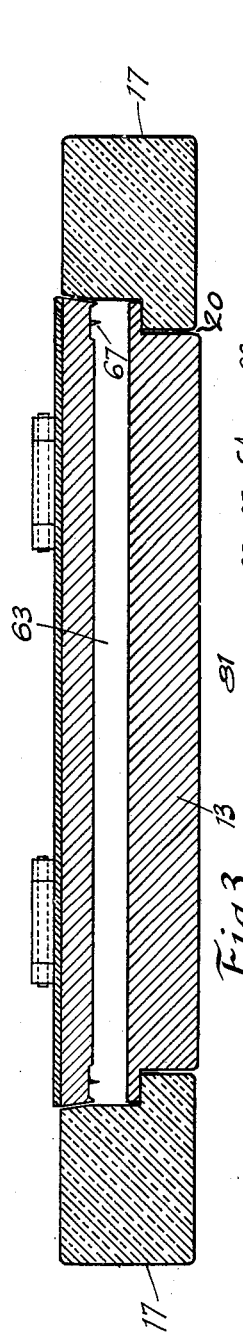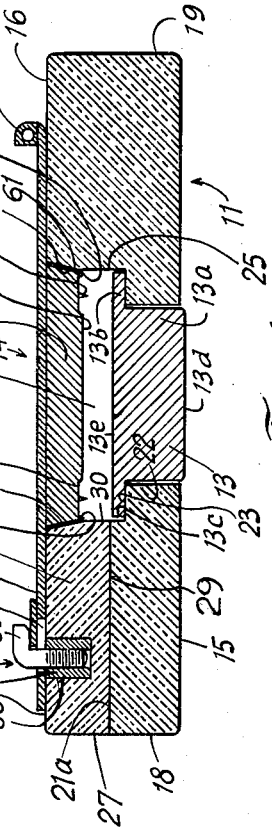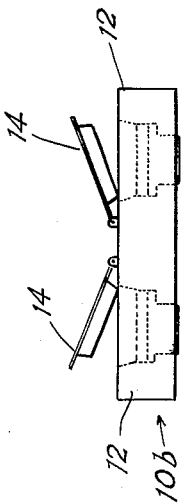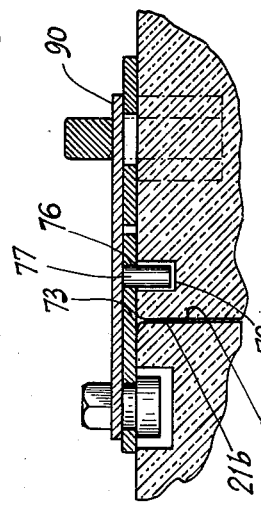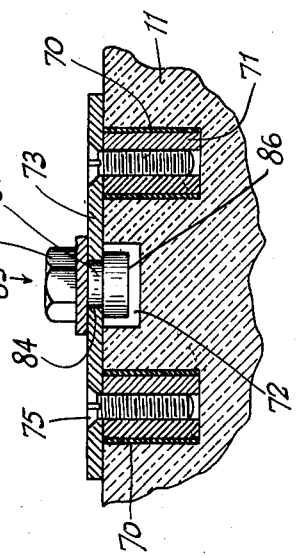

Nov. 15, 1949   J. GREGG   2,487,866
HIGH-FREQUENCY HEATED MOLD FOR SHOE SOLES
Filed Aug. 11, 1945   4 Sheets-Sheet 3
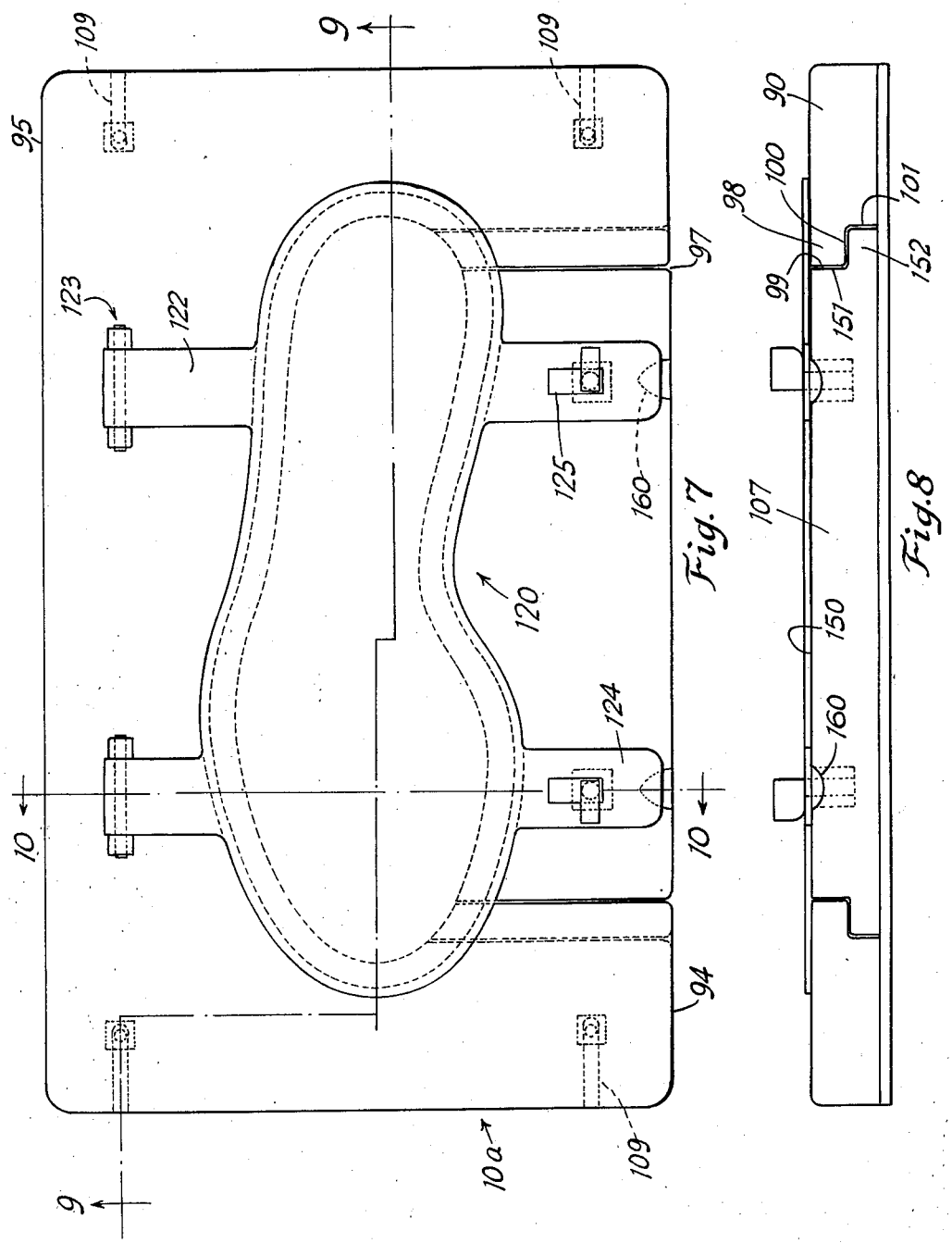
INVENTOR.
Jon Gregg
BY
J. B. Felsten
ATTORNEY.

Nov. 15, 1949  J. GREGG  2,487,866
HIGH-FREQUENCY HEATED MOLD FOR SHOE SOLES
Filed Aug. 11, 1945  4 Sheets-Sheet 4
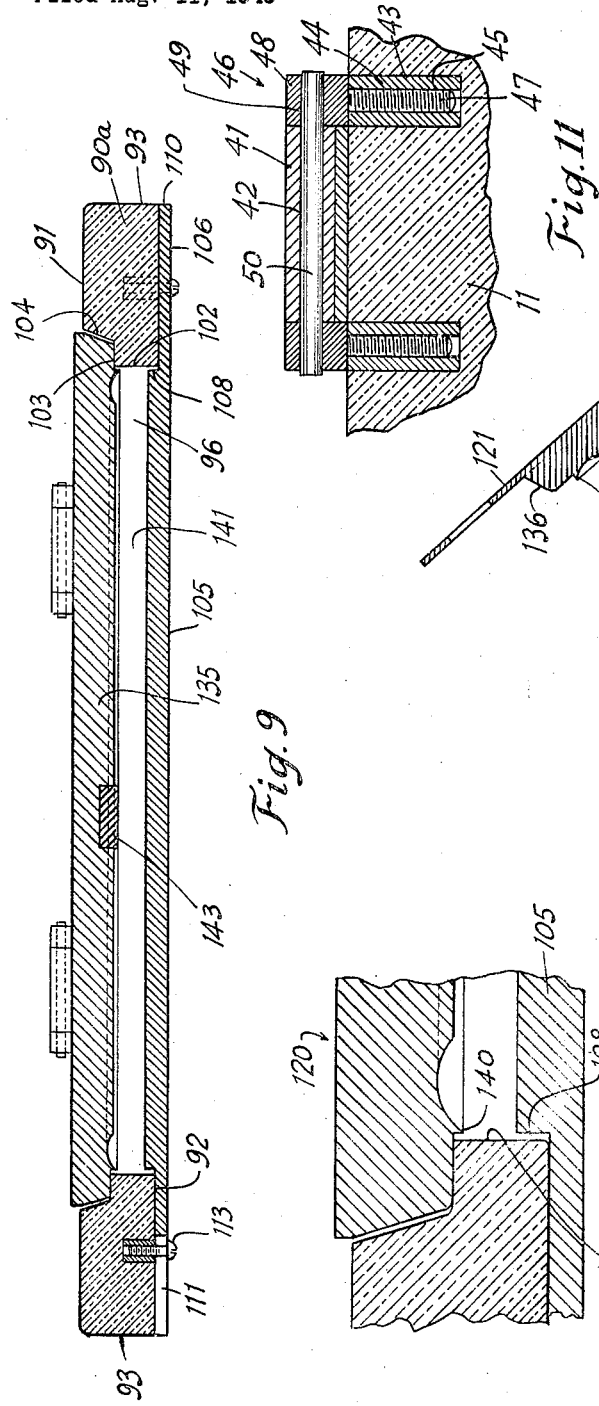
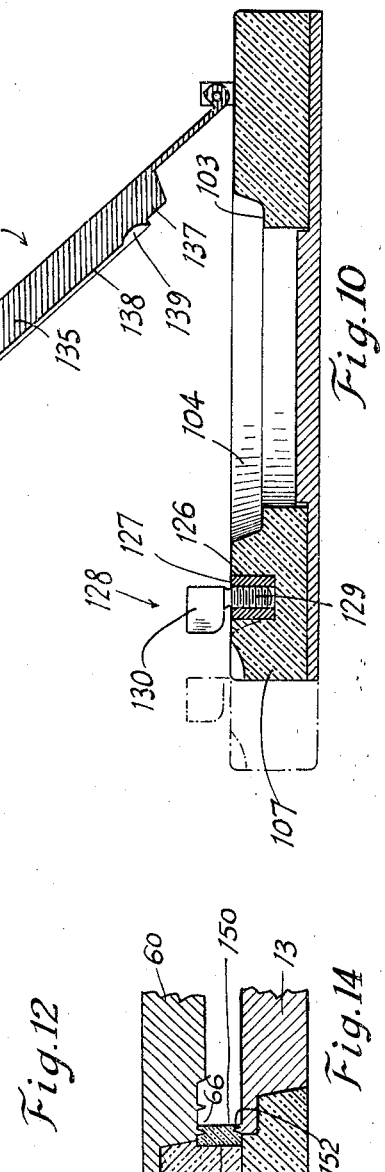
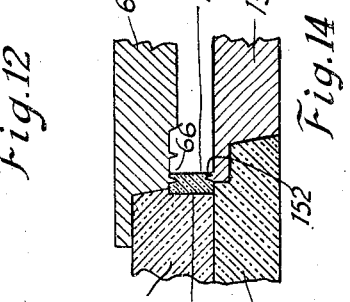
INVENTOR.
Jon Gregg
BY
J. B. Feesler
ATTORNEY.

Patented Nov. 15, 1949

2,487,866

UNITED STATES PATENT OFFICE 2,487,866

HIGH-FREQUENCY HEATED MOLD FOR SHOE SOLES

Jon Gregg, New Hope, Pa.

Application August 11, 1945, Serial No. 610,262

8 Claims. (Cl. 18—42)

This invention relates to molding devices. It is particularly directed to a mold for molding shoe soles, rugs, fabrics, mats, or other articles.

An object of this invention is to provide a mold of the character described which may be used for molding articles which are heated by the use of high or radio frequency current.

Another object of this invention is to provide a mold having means to impose on the article to be molded both vertical and horizontal pressure during the molding operation.

A further object of this invention is to provide a mold of the character described comprising a body made of non-conductive, heat resistant, dielectric, non-porous material such as glass, porcelain, ceramics or the like material and formed with a cavity, the top and bottom of the cavity being made of metal or other conductive material and comprising electrodes for the high frequency generator.

A further object of this invention is to provide a device of the character described so constructed that if ceramic or non-conductive parts are broken the metal or conductive parts may be reused.

A further object of this invention is to provide a mold of the character described comprising a body of ceramic material formed with a cavity, a bottom member for the cavity made of metal, a ram for the top of the cavity made of metal for applying vertical pressure to the molded material, and a sliding member on the body for applying horizontal pressure to the molded material, the construction being such that the vertical ram and the sliding part are self-locking.

A further object of this invention is to provide a mold of the character described having a floating bottom electrode at the bottom of the mold cavity which will permit good contact with the bus bar of a high frequency apparatus and which can be used to eject the sole or molded article from the mold, and which will equalize pressure on the sole or other molded article.

Still a further object of this invention is to provide a mold of the character described in which the top and bottom electrodes are so arranged that the high frequency waves will pass directly through the mold cavity, the mold being so constructed that no vertical metal parts penetrate down to a depth greater than the bottom surface of the ram from the upper surface of the mold nor project higher than the top surface of bottom member from the lower surface of the mold.

Yet a further object of this invention is to provide a compact, durable mold of the character described which shall be easy to open and close or interlock, and which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a top plan view of a mold embodying the invention;

Fig. 2 is a front edge view thereof;

Fig. 3 is a cross-sectional view taken on line 3—3 of Fig. 1;

Fig. 4 is a cross-sectional view taken on line 4—4 of Fig. 1;

Fig. 5 is a cross-sectional view taken on line 5—5 of Fig. 1;

Fig. 6 is a cross-sectional view taken on line 6—6 of Fig. 1;

Fig. 7 is a top plan view of a mold embodying the invention and illustrating a modified construction;

Fig. 8 is a front edge view thereof;

Fig. 9 is a cross-sectional view taken on line 9—9 of Fig. 7;

Fig. 10 is a cross-sectional view taken on line 10—10 of Fig. 7 and showing the cover plate opened up;

Fig. 11 is a cross-sectional view taken on line 11—11 of Fig. 1;

Fig. 12 is a partial enlarged vertical cross-sectional view of the mold; and

Fig. 13 is a transverse, cross-sectional view of a mold embodying the invention and illustrating a modification comprising a double mold cavity.

Fig. 14 is a fragmentary elevational cross sectional view of a modification.

Referring now in detail to the drawing, 10 designates a mold embodying the invention. The same comprises generally a body 11, a sliding part 12, a bottom plate or electrode 13, and a top plate and ram 14. The body 11 is made of electric insulating, heat resisting material, such as ceramics, and may be generally of prismatic shape. It has a bottom surface 15, a top surface 16, end surfaces 17, a front surface 18, and a rear surface 19.

Said body 11 is formed with a central through opening 20 and with a horizontal groove 21 extending from the front surface 18 to the through opening 20. The groove 21 has a bottom horizontal surface 21a, and end edge surface 21b. The through opening 20 comprises a lower portion 22 extending to the bottom surface 15 of the body. The shape of the portion 22 of the opening may be similar to the shape of the article to be molded although of smaller dimension. At the upper end of surface 22 is a horizontal shoulder 23 extending outwardly therefrom and disposed below surface 21a. Extending upwardly from the outer edge of shoulder 23 is a vertical surface 25 extending to a point above the horizontal surface 21a. The surface 25 extends all around from one edge 21b to the other edge 21b.

Extending upwardly from surface 25 is an upwardly and outwardly tapered surface 26 which also extends all around from one surface 21b to the other surface 21b. The sliding part 12 when in operational position on the mold, has a front surface 27 flush with surface 18. It has end surfaces 28 adapted to slidably contact the surfaces 21b. It has a bottom surface 29 having sliding contact with surface 21a. At the rear of part 12 is a surface 30 complementary to surface 25, and a surface 31 complementary to surface 26. The top surface 32 of part 12 is flush with the top surface 16 of part 11.

Mounted in body 11 is said bottom plate or electrode 13. It comprises a portion 13a slidably fitted within opening portion 22 and it is formed at the top with a horizontal integral flange 13b extending all around and adapted to abut the shoulder 23 of body 11. The outer edge 13c of flange 13b has sliding contact with the lower portion of surface 25. When the flange 13b contacts shoulder 23, the lower surface 13d of plate 13 is disposed somewhat below the lower surface 15 of body 11 and the upper surface 13e is flush with surface 21a. When the electrode 13 is pushed upwardly to a point where the lower surface 13d thereof is flush with said surface 15, then the upper surface 13e of the electrode is somewhat higher than surface 21a.

The top member 14 is a combination cover plate and ram. It comprises a portion 14a contacting the upper surface 16 of the body. Extending rearwardly from portion 14a are a pair of parallel arms 40 likewise adapted to contact the upper surface 16. Fixed to the upper surface of the rear ends of said arms 40 are hinge sleeves 41 formed with through openings 42.

Means is provided to pivotally connect member 14 to body 11. To this end said body is formed in its upper surface and on opposite sides of each sleeve 41 with a pair of blind holes 43. In each hole is a sleeve 44 formed with an internal screw threaded opening 45. The sleeve 44 may be embedded in the holes by lead or any other suitable material. Screwed to each opening 45 is a hinge member 46. Each member 46 has a screw threaded stem 47 screwed into the hole 45. It is formed at its upper end with a head 48 having a through opening 49. The openings 49 register with the openings 42. Extending through said openings 42, 49 are pivot pins 50. Extending from the plate portion 14a toward the front of the mold, are a pair of parallel arms 52 adapted to overlie the sliding part 12. Arms 52 may each be formed with a rectangular slot or opening 54 adjacent their outer ends, for the purpose hereinafter appearing.

Extending from the underside of plate 14a is an integral ram 60 adapted to project down into the opening 20 when the plate 14 is swung downwardly. The ram 60 has a downwardly and inwardly tapered side wall 61 extending all around and having the shape of the surfaces 26, 31.

Said ram has an undersurface 62 spaced above the top surface 13e of the bottom plate 13 and forming therewith a mold cavity 63. The height of the mold cavity 63, when the bottom terminal 13 is moved upwardly to bring surface 13d flush with bottom surface 15, is of a depth somewhat less than the height of the finished molded article. When the terminal 13 is in the position shown in Fig. 4, the height of the cavity is substantially equivalent to the height of the molded article.

The ram 60 is formed on its underside, all around the peripheral edge thereof with a shallow recess 64. Adjacent the outer edge of the recess 64 is an outwardly and downwardly inclined surface 65 forming a knife edge 66 at the lower end of the peripheral edge of the ram and lower than surface 62, the purpose of which will appear hereinafter. Extending downwardly from the bottom of the recess 64 are a plurality of spaced cleats or pins 67.

Means is provided to guide part 12 within groove 21. To this end the upper surface of body 11 is formed, on each side of groove 21, with a pair of spaced aligned blind openings 70 parallel to surfaces 21b. Embedded within each opening is a sleeve 71 formed with a screw threaded through opening. Said body 11 is furthermore formed with a cylindrical blind opening 72 between each pair of openings 70, for the purpose hereinafter appearing.

Fixed to the upper surface of the body 11 are a pair of similar, symmetrically disposed guide plates 73 overlapping part 12 for retaining said part on surface 21a. Plates 73 are affixed to body 11 by means of screws 75 passing through openings in the plate and screwed within the screw threaded sleeve 71.

Means is provided to limit sliding movement of part 12 relative to body 11. To this end, each of plates 73 is formed with an opening 76 in which is affixed a pin 77 projecting downwardly from said plate. Part 12 is formed with slots or grooves 78 parallel and adjacent to surfaces 28. The pins 77 project into the slots 78. The pins thus serve to prevent removal of part 12, and also serve to limit the inward movement of part 12 to a point where surfaces 30, 31 thereof will be in complementary position relative to surfaces 25, 26 of body 11.

Means is provided to interlock the top plate in molding position. To this end part 12 is formed with a pair of blind openings 80 in the upper surfaces thereof aligned with and overlapping openings 54, in arms 52. Fixed within each opening 80 is a sleeve 81 formed with a screw threaded opening. Screwed within each threaded opening is a hooked member 82 having a head 83 projecting rearwardly. The underedge of each of the heads 83 is spaced above the upper surface of member 14. The size of the head 83 is such as to permit said head to pass through slot 54. Thus member 14 may be swung downwardly to horizontal position, so that the heads 83 pass upwardly through slots 54. Each plate 73 is formed with a bearing opening 84. Rotatably mounted therein is a pivot pin 85. Each pivot pin 85 has a circular head 86 at its lower end received within opening 72. It is formed with a shank 87 passing through opening 84. At its upper end is a polygonal head 88 spaced above plate 73. Received on each shank 87 and fixed to the nut head 88 is a lock arm 90, contacting the upper surfaces of plate 73. The lock arms 90 are adapted to be swung beneath the heads 83 of the retainer members 82 to lock the cover or top terminal in molding position.

Although the mold is shown, for the purpose of illustration, as being adapted to mold a shoe sole, it will be understood that various other articles, such as mats, rugs, fabrics, etc., may be molded with such a mold. The shape of the cavity will, of course, depend upon the article to be molded. The mold described herein is particularly useful for molding articles by use of high or radio frequency current. When the top and bottom plates 14 and 13 are contacted with terminals of a high frequency current machine or apparatus, high frequency current will pass through the mold cavity 63. It is therefore possible to mold in such cavities shoe soles such as shown in my Patent No. 2,361,938, dated November 7, 1944, or any other shoe sole or other article in which a thermoplastic or thermosetting material is to be heated for curing or plasticizing the same.

It will now be understood that the top ram provides vertical pressure, and the sliding part 12 provides lateral or side pressure. The floating bottom plate will equalize pressure in the mold. At the time of loading, the mold is flat and the bottom surface of the bottom plate is flat on the loading table. The bottom plate is therefore displaced vertically up into the mold cavity. It goes down at the time the mold is released from loading. Then the sole will expand immediately and the floating ram will equalize the pressure over the bottom of the sole. The bottom plate keeps the mold cavity full and need not go down the full distance. Said floating bottom plate permits a fool-proof contact with the bus bar of a high frequency machine, such as described and shown in my co-pending application filed on even date herewith entitled Methods of and apparatus for making molded articles, Serial No. 610,261.

It is a characteristic of high frequency waves to act up and down from the positive electrode to the negative electrode, and since the mold cavity is between the two electrodes, the article to be molded receives the full current. There are no vertical metal parts penetrating to a depth greater than the lower surface of the top ram or top surface of bottom member. The mold is easy to open and close and interlock.

The necessity for preforming the sole is eliminated and hence the labor required to make the soles is cut down. Furthermore, the bottom electrode could be used to eject the sole. Preforming may be eliminated because this mold acts as a preformer, although it is understood that preforming may be employed if desired.

The locking arms 90 may be rotated by means of handles provided with socket openings to receive the nuts 85. The handles may be turned in opposite directions to simultaneously open the interlocking arms.

In molding rope soles, such as shown in my Patent No. 2,361,938, a strip of uncured rubber or thermoplastic may be placed in recess 64. The strip will become impinged upon the pins 67. During the molding operation, surface 65 will retain the rubber from flowing to the side edge of the sole. Also the edge 66 serves as a cutoff to trim the outer edge of the strip. The strip is, of course, molded to the sole during the molding operation.

In Figs. 7, 8, 9, 10 and 12 there is shown a mold 10a embodying the invention and illustrating a modified construction. The mold 10a comprises a body 90 likewise made of ceramic material. Body 90a is of generally prismatic shape and has a top surface 91, bottom surface 92, end surfaces 93, a front surface 94, and a rear surface 95. It is formed with a central through opening 96, and with a slot 97 extending from the through opening 96 to the front edge 94. On each side of the slot 97 are inwardly projecting horizontal flanges 98 having inner surfaces 99 and end surfaces 100. At the lower ends of the groove are surfaces 101. The opening 96 comprises a vertical surface 102 which has part of the shape of a shoe sole or other article to be molded. At the other end of surface 102 is a horizontal outwardly extending surface 103. Shoulder 103 is at the level of surfaces 100. Extending upwardly from the outer edges of surfaces 103 is an upwardly and outwardly tapered surface 104 extending all around from one edge of the groove 97 to the opposite edge.

Attached to the underside of body 90a is a plate or bottom terminal 105. Plate 105 has a portion 106 contacting the undersurface 92 of body 90a, and also adapted to be contacted by the undersurface of sliding member 107 made of ceramic material, and slidably mounted on the body 90a in groove 97. Plate 105 is formed with an upwardly extending portion 108 projecting into the cavity 102, and having the contour of the sole or other article to be molded. The plate 105 is formed at the ends thereof with parallel slots 109 extending to the end edges 110 thereof.

Means is provided for fixing plate 105 to the body 90a. To this end, the body 90 is formed with upwardly extending blind openings 111 receiving screw threaded sleeves 112 embedded therein by means of lead or any other suitable manner. Screwed into the threaded sleeves are screws 113 passing through the slots 109. The slots 109 permit expansion of the plate.

Hinged to the top of body 90a is a combination cover plate and top ram 120. The same comprises a top plate 121 having the general shape of a shoe sole or other article to be molded but of larger dimension. Extending rearwardly from plate 121 are parallel arms 122 hinged as at 123 to the top plate by the same hinge means as described above for member 14. Extending forwardly from top plate 120 are parallel arms 124 formed with longitudinal slots 125. Formed in slider 107, at points beneath the arms 124, are openings 126 in which are embedded internally screw threaded sleeves 127. Screwed within each sleeve is a latch 128. Each member 128 comprises a screw thread 129, engaging the threads of sleeve 127, and a head 130 offset to one side and spaced above the top surface of body 90a. When the heads 130 are parallel and in alignment with slots 125, said heads will pass through the slots. After the cover member is swung down to horizontal position, the heads 130 will be turned outwardly to the position shown in Fig. 7 to lock the cover in horizontal position.

The top cover member 120 is formed on its underside with a ram portion 135 having the outline of the article to be molded and formed with inwardly and downwardly tapered side surfaces 136 complementary to surfaces 104. Said ram is formed on its underside all around the peripheral edge thereof with surfaces 137 adapted to contact the shoulder or surface 103.

Inwardly of surface 137 is a bottom surface 138 forming the top of the mold cavity. The surface 138 is formed around its peripheral edge, with a recess 139 to receive a strip of uncured rubber or thermoplastic material to be molded to the sole. At the outer edge of surface 137 is a knife edge 139 adapted to trim the strip placed in the recess 140.

Between the top surfaces of plate 105 and the undersurface of the ram 137 is a mold cavity 141 in which the article to be molded is placed. A trade-mark stamp 143 may be embedded in the underside of the ram portion 135. The slider 107 rests on plate 105. It has a top surface 150 flush with the top surface of body 90a. It has at its sides, surfaces 151 adapted to engage the surfaces 99. It is formed with outwardly extending flanges 152 engaging the surfaces 100, 101 of the body. The slider 107 is therefore guided on the body. After the article to be molded is placed in the mold cavity, the sliding member 107 is moved to the position shown in Fig. 10. The top plate is then moved downwardly and members 128 turn to interlock the top plate. The top plate 120 and bottom plate 105 may constitute terminals for molding articles by means of high frequency current.

While the molds 10 and 10a have been shown as single mold members, it is understood that the molds may have a plurality of cavities. Thus for example in Fig. 13 there is shown a device 10b containing a multiple mold cavity. The device 10b may be similar to two members 10 placed rear edge to rear edge and joined. Thus member 10b is provided with two members 14 symmetrically disposed and with two sliders 12 adapted to slide outwardly in opposite directions. Any suitable number of mold openings may be provided in the mold member.

It will be noted that the top side of sliders 12 as well as 107 are formed with notches 160 beneath the forwardly extending arms of the top plate to permit a tool to be inserted for prying open or loosening the top plate should it become stuck.

Preferably the top and bottom terminals are of substantially the same thickness to retain the heat equally above and below the mold cavity. This mold is designed for preheating before application of radio frequency and post heating after, for which reason it is desirable to have equal heat above and below the cavity.

In Fig. 14 there is shown a modified construction. In said figure 150 designates a sealing strip to prevent leakage of rubber or other thermoplastic material in the mold cavity during curing or molding operation. Strip 150 may be made of "Pliofilm," "Koroseal" or the like soft, compressible, impervious material having a melting or fusing point above the temperatures to which the mold will be subjected.

Strips 150 are adhered to the inner surfaces 151 of the mold body and slider extending all around the mold cavity. Edge 66 of the ram 60 presses into the upper edge of the strip to prevent leakage at the top. The lower member 13 may be formed with a complementary upwardly extending peripheral edge 152 pressing against the lower edge of said spring to prevent leakage at the bottom.

Strip 150 thus prevents mold material from flowing between the metal members 65, 13 and the ceramic body and slide.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A mold comprising a body made of electric and heat insulating material, said body being formed with a mold cavity extending to the upper surface of said mold body, said mold body being formed with a horizontal groove communicating with the mold cavity, a sliding member slidably mounted in the groove in the mold body and made of heat and electric insulating material and adapted to close one side of the mold cavity, a top plate hinged to the top of the mold body, said top plate and bottom plate being made of electric conducting material, and means to lock the top plate in horizontal position, and the sliding part in molding position.

2. A mold comprising a body made of electric insulating material, said body being formed with a through opening, the top of the mold body being formed with a groove extending from the top of the through opening to an edge of the mold body, a bottom plate within the through opening, said body being formed with shoulders to support the bottom plate for sliding movement, the bottom plate constituting the bottom of the mold cavity, a sliding part made of electric insulating material, slidably mounted in said groove, a top plate provided with a ram projecting into the top of the through opening and forming the top of the mold cavity, said sliding part having a surface adapted to contact the ram, and a surface constituting a continuation of the side surface of the mold cavity, said top and bottom plates being made of electricity conducting material.

3. A mold comprising a body made of electric insulating material, said body being formed with a through opening, the top of the mold body being formed with a groove extending from the top of the through opening to an edge of the mold body, a bottom plate within the through opening, said body being formed with shoulders to support the bottom plate for sliding movement, the bottom plate constituting the bottom of the mold cavity, a sliding part made of electric insulating material, slidably mounted in said groove, a top plate provided with a ram projecting into the top of the through opening and forming the top of the mold cavity, said sliding part having a surface adapted to contact the ram, and a surface constituting a continuation of the side surface of the mold cavity, said top and bottom plates being made of electricity conducting material, said ram being formed on its underside, and around the periphery thereof, with a shallow recess to receive a strip of moldable material, and cleats at the bottom of the recess on which to impinge said strip of material.

4. A mold comprising a body made of electric insulating material, said body being formed with a through opening, the top of the mold body being formed with a groove extending from the top of the through opening to an edge of the mold body, a bottom plate within the through opening, said body being formed with shoulders to support the bottom plate for sliding movement, the bottom plate constituting the bottom of the mold cavity, a sliding part made of electric insulating material, slidably mounted in said groove, a top plate provided with a ram projecting into the top of the through opening and forming the top of the mold cavity, said sliding part having a surface adapted to contact the ram, and a surface constituting a continuation of the side surface of the mold cavity, said top and bottom plates being made of electricity conducting material, said ram being formed on its underside, and around the periphery thereof, with a shallow recess to receive a strip of moldable material, and cleats at the bottom of the recess on which to impinge said strip of material, said ram being furthermore formed at the outer edge of said recess with a downwardly projecting surface terminating in an edge to trim said strip.

5. A mold comprising a mold body, said body being formed with a mold cavity and with a groove communicating with said cavity, a sliding part within said groove being adapted to close a side of said mold cavity, a pair of plates fixed to said body and overlapping said sliding part to retain the sliding part on said body, and a top plate hinged to said body and formed with a ram adapted to project into the mold cavity, said top plate being formed with openings, hooks on said sliding part adapted to pass through said openings, and locking arms pivoted to said plates and adapted to engage said hooks to retain the top plate in locking position on said mold.

6. A mold comprising a mold body, said body being formed with a mold cavity and with a groove communicating with said cavity, a sliding part within said groove being adapted to close a side of said mold cavity, a pair of plates fixed to said body and overlapping said sliding part to retain the sliding part on said body, and a top plate hinged to said body and formed with a ram adapted to project into the mold cavity, said top plate being formed with openings, hooks on said sliding part adapted to pass through said openings, and locking arms pivoted to said plates and adapted to engage said hooks to retain the top plate in locking position on said mold, said bottom plate being slidably mounted in the mold cavity and being adapted to project below the mold cavity.

7. A mold comprising a mold body, a bottom plate at the bottom of the mold, said mold body being formed with a mold cavity, the body being formed with a groove extending from the mold cavity to an edge of said mold body, a part slidably mounted in said groove, and adapted to close a side of the mold body, a top plate hinged to the top of the mold body and means on the sliding part to lock said top plate in molding position, said top plate being provided with a ram projecting into the mold cavity.

8. A mold comprising a mold body, a bottom plate at the bottom of the mold, said mold body being formed with a mold cavity, the body being formed with a groove extending from the mold cavity to an edge of said mold body, a part slidably mounted in said groove, and adapted to close a side of the mold body, a top plate hinged to the top of the mold body and means on the sliding part to lock said top plate in molding position, said top plate being provided with a ram projecting into the mold cavity, and means to limit sliding movement of said sliding part.

JON GREGG.

REFERENCES CITED

The following references are of record in the file of this patent:

UNITED STATES PATENTS

| Number | Name | Date |
|---|---|---|
| 434,031 | Ostrom | Aug. 12, 1890 |
| 880,318 | Maddox | Feb. 25, 1908 |
| 1,198,874 | Sloper | Sept. 19, 1916 |
| 1,350,105 | Maranville | Aug. 17, 1920 |
| 1,594,596 | Brown | Aug. 3, 1926 |
| 1,964,911 | Haas | July 3, 1934 |
| 2,203,543 | Pancorbo | June 4, 1940 |
| 2,341,617 | Hull | Feb. 15, 1944 |
| 2,350,971 | Pecker et al. | June 6, 1944 |

FOREIGN PATENTS

| Number | Country | Date |
|---|---|---|
| 272,419 | Germany | Mar. 31, 1914 |